US009680927B2

(12) United States Patent
Knight et al.

(10) Patent No.: US 9,680,927 B2
(45) Date of Patent: Jun. 13, 2017

(54) CLOUD TABS

(75) Inventors: Paul R. Knight, San Francisco, CA (US); Jeffrey S. Miller, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 258 days.

(21) Appl. No.: 13/492,057

(22) Filed: Jun. 8, 2012

(65) Prior Publication Data

US 2013/0332560 A1 Dec. 12, 2013

Related U.S. Application Data

(60) Provisional application No. 61/595,114, filed on Feb. 5, 2012.

(51) Int. Cl.
*H04L 29/08* (2006.01)

(52) U.S. Cl.
CPC .......... *H04L 67/1095* (2013.01); *H04L 67/02* (2013.01)

(58) Field of Classification Search
CPC ...... G06F 9/3851; G06F 8/38; G06F 17/3089; H04L 67/1095
See application file for complete search history.

(56) References Cited

U.S. PATENT DOCUMENTS

| 6,393,462 | B1 * | 5/2002 | Mullen-Schultz | 709/206 |
|---|---|---|---|---|
| 7,526,728 | B2 * | 4/2009 | Apparao et al. | 715/745 |
| 8,225,191 | B1 * | 7/2012 | Kalman | 715/203 |
| 8,386,563 | B2 * | 2/2013 | Parks et al. | 709/203 |
| 8,392,617 | B1 * | 3/2013 | Weber et al. | 709/248 |
| 8,478,816 | B2 * | 7/2013 | Parks et al. | 709/203 |
| 8,812,601 | B2 * | 8/2014 | Hsieh et al. | 709/206 |
| 8,886,710 | B2 * | 11/2014 | Evans et al. | 709/203 |
| 8,914,840 | B2 * | 12/2014 | Reisman | 725/133 |
| 2003/0229900 | A1 * | 12/2003 | Reisman | 725/87 |
| 2007/0283011 | A1 | 12/2007 | Rakowski et al. | |
| 2009/0164581 | A1 | 6/2009 | Bove et al. | |
| 2009/0248737 | A1 * | 10/2009 | Shukla et al. | 707/103 R |
| 2009/0271744 | A1 | 10/2009 | Anders, Jr. | |
| 2010/0223542 | A1 * | 9/2010 | Vuong et al. | 715/206 |
| 2011/0319056 | A1 * | 12/2011 | Toy et al. | 455/412.2 |
| 2012/0079126 | A1 * | 3/2012 | Evans et al. | 709/230 |

(Continued)

FOREIGN PATENT DOCUMENTS

| JP | 2007 041976 A | 2/2007 |
|---|---|---|
| TW | 201131471 A | 9/2011 |

OTHER PUBLICATIONS

NPL :Simon Mackie, Emulate Safari's Reader Mode in Other Browsers With Readability, Jun. 21, 2010.*

(Continued)

*Primary Examiner* — Jerry Dennison
(74) *Attorney, Agent, or Firm* — Morrison & Foerster LLP

(57) ABSTRACT

The presently disclosed techniques related to data transfer and synchronization between multiple electronic devices. The multiple electronic devices may be logged onto a user's account with a cloud computing service so that they may transfer data relating to websites that they have accessed to the cloud computing service so that such data may be synchronized amongst the multiple electronic devices. A tab screen on each electronic device may allow a user to view the other linked devices as well as the websites that they have accessed so that the user may select such websites if so desired.

40 Claims, 14 Drawing Sheets

(56) References Cited

U.S. PATENT DOCUMENTS

| | | | |
|---|---|---|---|
| 2012/0096069 A1* | 4/2012 | Chan | 709/203 |
| 2012/0297017 A1* | 11/2012 | Livshits et al. | 709/217 |
| 2013/0007203 A1* | 1/2013 | Szu | 709/217 |
| 2013/0311597 A1* | 11/2013 | Arrouye et al. | 709/217 |
| 2013/0311986 A1* | 11/2013 | Arrouye et al. | 717/175 |
| 2014/0075130 A1* | 3/2014 | Bansal et al. | 711/153 |

OTHER PUBLICATIONS

Mozilla Services, Firefox Sync Terms of Service (for versions prior to Firefox 29), Aug. 19, 2010, 4 pages.*

Mozilla Labs, Introducing Weave, Dec. 21, 2007, 88 pages.*

Dybwad, "Google Chrome Gets Bookmark Syncing;" Nov. 2, 2009 (retried on Jul. 30, 2013), 2pgs.—http://mashable.com/2009/11/02/chrome-bookmark-sync/>.

Bell, "Twitter Notifications, iCloud Tabs & Location-Based Reminders Appear in Latest OSX10.8 Beta:" Mar. 19, 2012, pp. 4 pgs.—http://www.cultofmac.com/154522/twitter-notifications-icloud-tabs-location-based-reminders-appear-in-latest-os-x-10-89-beta/>.

Akhgari, "Don't leave a trace: Private Browsing in Firefox;" Nov. 4, 2008 (retrieved on Jul. 30, 2013), 5 pgs.—http://ehsanakhgari.org.blog/2008-11-04/dont-leave-trace-private-browsing-firefox>.

International Search Report and Written Opinion for PCT Application No. PCT/US2013/044710 dated Aug. 15, 2013, 13 pgs.

"Firefox Sync—Take your bookmarks, tabs, and personal information with you"; Mozilla.org; Jun. 1, 2012 (Jun. 1, 2012). XP002731181. Retrieved from the Internet: URL:https:jjweb.archive.orgjweb/20120601020556/http:jjsupport.mozilla.orgjen-US/kb/firefox-sync-take-your-bookmarks-and-tabs-with-you?redirectlocale=en-US&redirectslug=what-firefox-sync [retrieved on Oct. 15, 2014].

Google Labs: "Google Browser Sync"; May 8, 2012 (May 18, 2012). XP002731152. Retrieved from the Internet: URL:https:jjweb.archive.orgjweb/20120518050142/http://www.google.comjtools/firefoxjbrowsersyncjfaq.html [retrieved on Oct. 15, 2014].

Eddie Smith; "The expert's guide to Instapaper"; May 23, 2012 (May 23, 2012). XP002730467. Retrieved from the Internet: URL:http://www.macworld.comjarticle/1166898/the experts guide to instapaper.html [retrieved on Sep. 26, 2014].

Extended European Search Report for EP Application No. 13171047.7 dated Oct. 29, 2014; 8 pgs.

Decker et al., U.S. Appl. No. 61/595,114, filed Feb. 5, 2012 titled "Navigating Among Content Items in a Browser Using an Array Mode", 83 pages.

International Preliminary Report on Patentability received for PCT Patent Application No. PCT/US2013/044710, mailed on Dec. 18, 2014, 11 pages.

Office Action received for Taiwanese Patent Application No. 102120412, mailed on Feb. 25, 2015, 15 pages (6 pages of English translation and 9 pages of Official Copy).

* cited by examiner

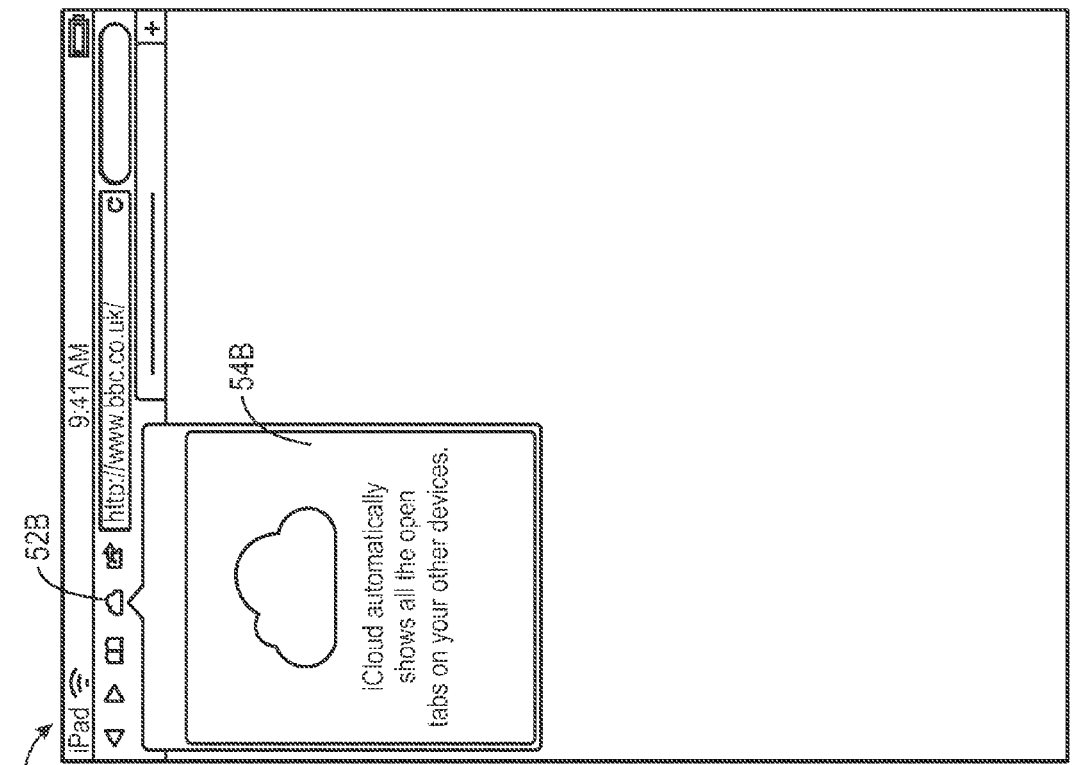
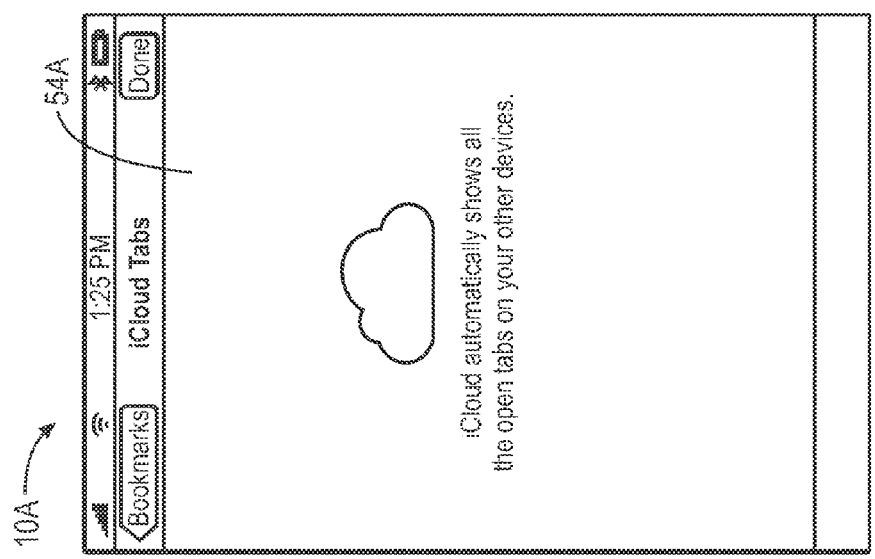

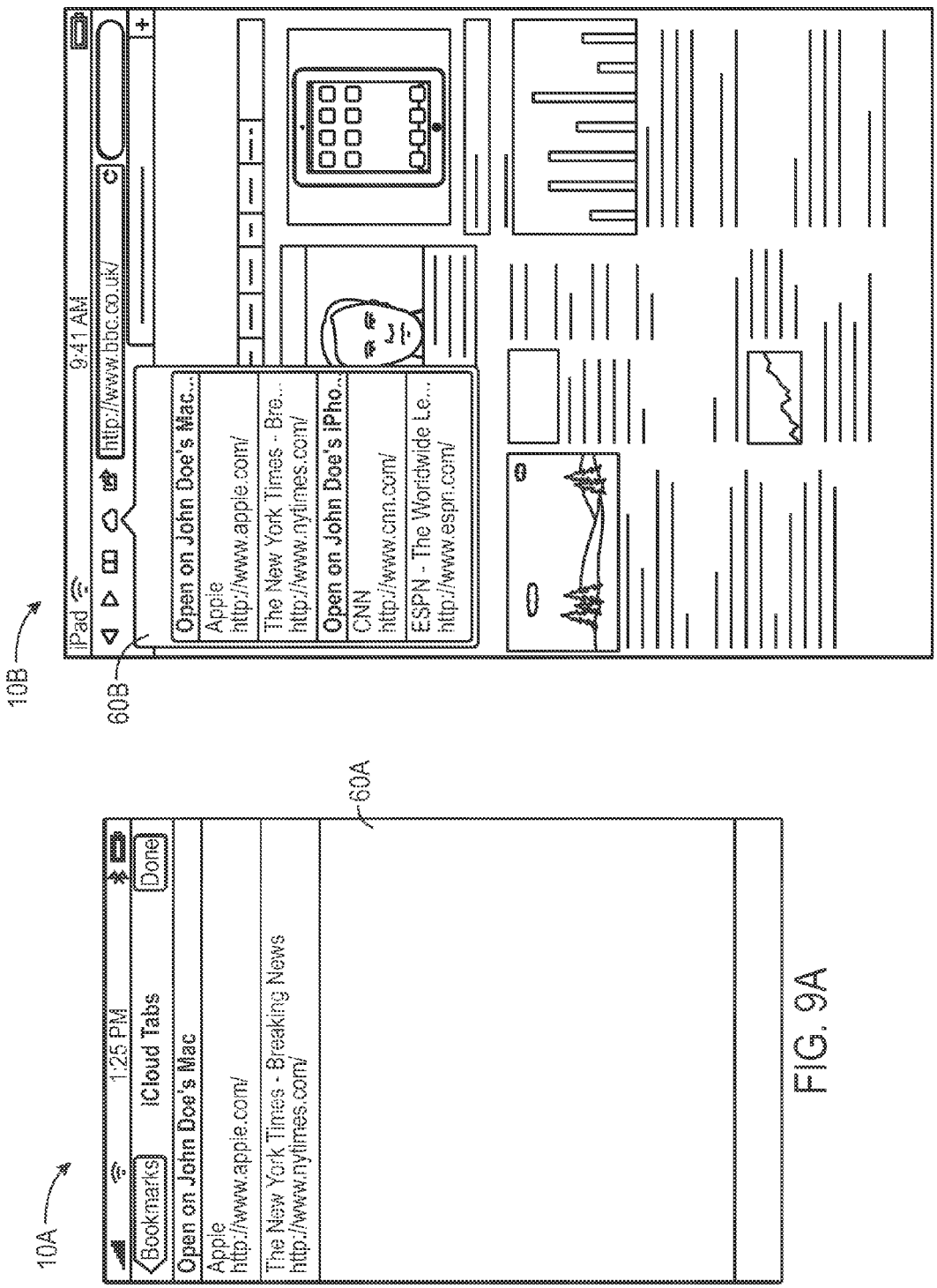

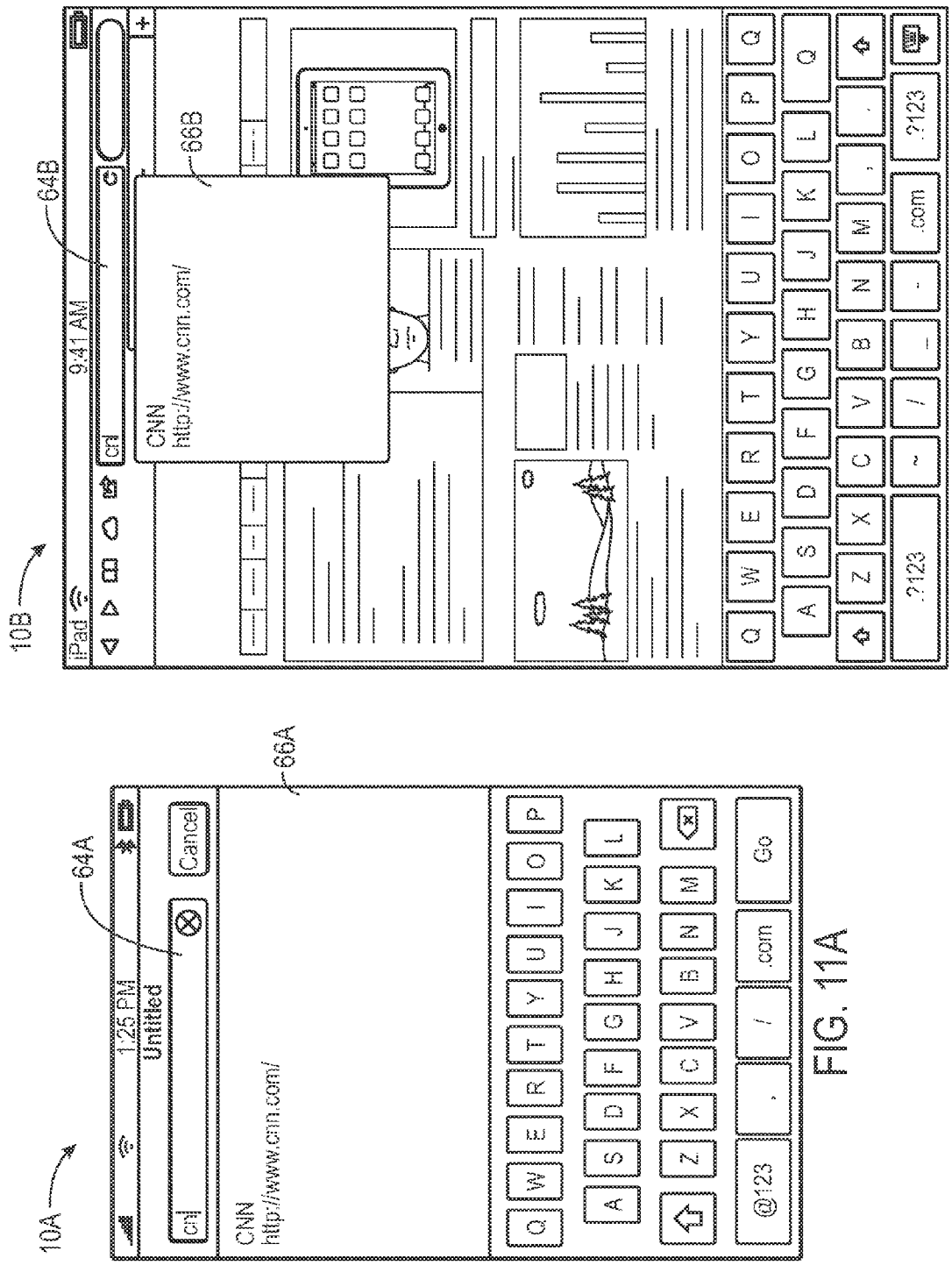

CLOUD TABS

RELATED APPLICATIONS

The present application is related to U.S. application Ser. No. 61/595,114, filed on Feb. 5, 2012, the subject matter of which is hereby incorporated by reference in its entirety for all purposes.

BACKGROUND

The present disclosure relates generally to electronic devices and cloud computing, and more particularly, to techniques for synchronizing electronic devices using cloud computing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In today's fast-paced society, it is very common for people to use several electronic devices to "stay connected" with their various responsibilities. For example, those that spend time at home or at the office often use a desktop or laptop computer to monitor e-mail, stay current on social websites, browse the Internet, and perform various other tasks. However, such electronic devices are not particularly convenient when called away from the home or office, particularly for a relatively short amounts of time, such as lunch, business meetings, soccer practice, etc. During these periods, people often rely upon pocket-sized handheld devices, such as cellular smart phones, to stay connected. Additionally, people often turn to larger handheld devices, such as tablet computers, to stay connected when circumstances permit, since such devices strike a good balance between portability and a larger, easier to use format.

Although each of the aforementioned devices typically possess Internet capability, through the use of WiFi and/or cellular networks, such devices are typically used independently of one another. As a result, the data on one device is not synchronized with the data on any of the other devices unless the user purposely chooses to synchronize one device with another, typically by connecting the devices together and performing a specific synchronization routine. Because such synchronization routines require user action and are relatively time consuming, most users typically synchronize their devices relatively infrequently. Moreover, such synchronization routines only synchronize data between devices at the time the devices are connected, so any subsequent use of the devices is again performed independently in an unsynchronized manner.

The use of cloud computing services can facilitate the synchronization of data between a user's multiple devices. The term "cloud" is often used a generic reference to the Internet based upon cloud drawings that are used to represent the internet in computer network diagrams as an abstraction of the underlying infrastructure that it represents. More recently, however, the term cloud has been used in conjunction with computing services that may be provided over the Internet at a cost to customers. For example, presently, at least Apple, Amazon, Microsoft, Google, and Dropbox offer cloud computing services that host data over the Internet. Generally, users of these cloud computing services may store media and other data on the Internet so that they can access it from any of their multiple electronic devices, as opposed to storing such information onto the memory of any of their particular electronic devices. For example, a user may store music, photos, books, or videos on the cloud and access it from any of their multiple devices. Apple's iCloud®, for example, operates "invisibly" or automatically, so that when a user takes a photograph using their iPhone®, it is automatically sent to any other electronic devices linked to their iPhone through iCloud®, such as their iMac® or iPad®. Similarly, if a user edits a document in the Pages application on their iMac®, the same edit appears on the Pages application of their iPhone®.

However, despite the number of different cloud computing services available, none provide satisfactory synchronization of Internet browsing amongst multiple devices. Further, none provide any such synchronization techniques that may enhance a user's experience and facilitate more efficient use of the various devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to various techniques that may be used to synchronize data among multiple electronic devices. For example, certain techniques facilitate the synchronization of data used during website browsing on multiple devices. These techniques may provide website information, such as URLs, between any linked devices, as well as identify which device is associated with such website information. This information may be provided to the user in the form of a screen or a drop-down tab that may be accessed on each of the user's devices. Furthermore, such information may include information relating to whether the item in the tab was in "reader" mode, information relating to magnification of the window that was opened in another device, backward and/or forward history, scroll position on the web page, and autocomplete information when entering an address into an address field on any of the linked devices.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 7A, 7B, and 7C illustrate and example of an initial screen or drop down tab for a hand-held device, tablet device, and laptop computer, respectively, in accordance with an embodiment;

FIGS. 9A and 9B illustrate an example of a screen or drop-down tab for the handheld device and the tablet device, respectively, that show websites that have been accessed or opened by the other device when the tablet device is in a private browsing mode, in accordance with an embodiment;

FIGS. 11A and 11B illustrate an example of screens of the handheld device and the table device showing a suggested auto completion of a website entry, in accordance with an embodiment.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in detail below, the present disclosure relates to various techniques for transferring and synchronizing data amongst multiple different electronic devices. In particularly, the techniques relate to the sharing and synchronization of website information amongst the devices in a manner that is user friendly and convenient. The disclosure techniques allow a user to view and select websites that have been accessed by any of the devices. The techniques also allow a user to access a website in the same mode and/or same location as the website is currently being accessed or was previously being accessed by one of the other devices.

Figure 1:
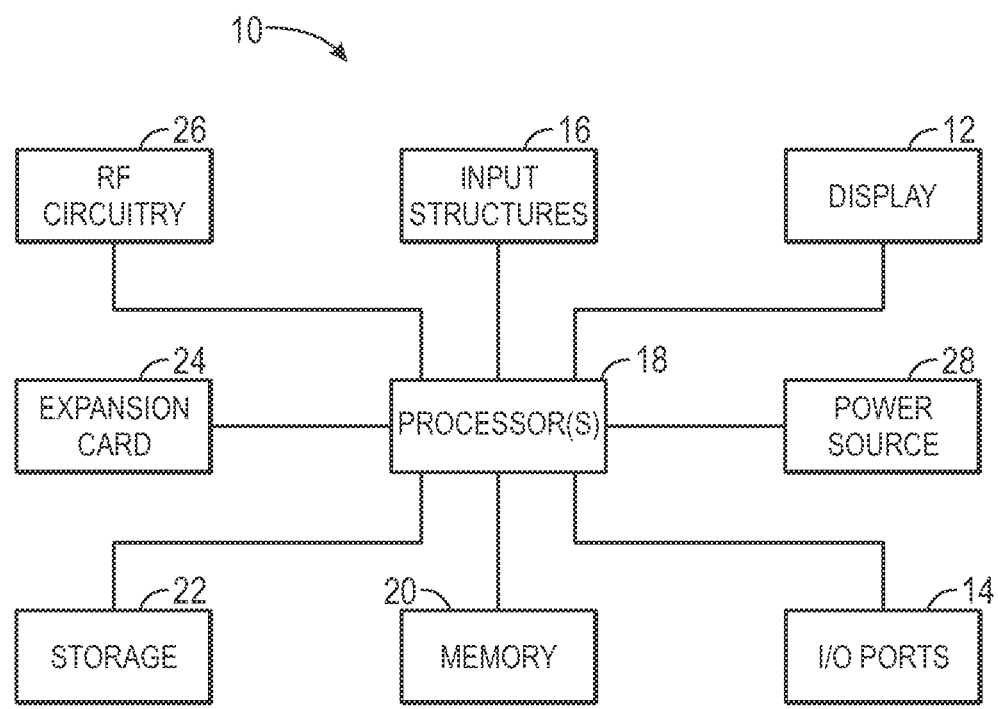
FIG. 1 illustrates a block diagram of an electronic device that may utilize the synchronization techniques disclosed herein, in accordance with aspects of the present disclosure.
Figure 2:
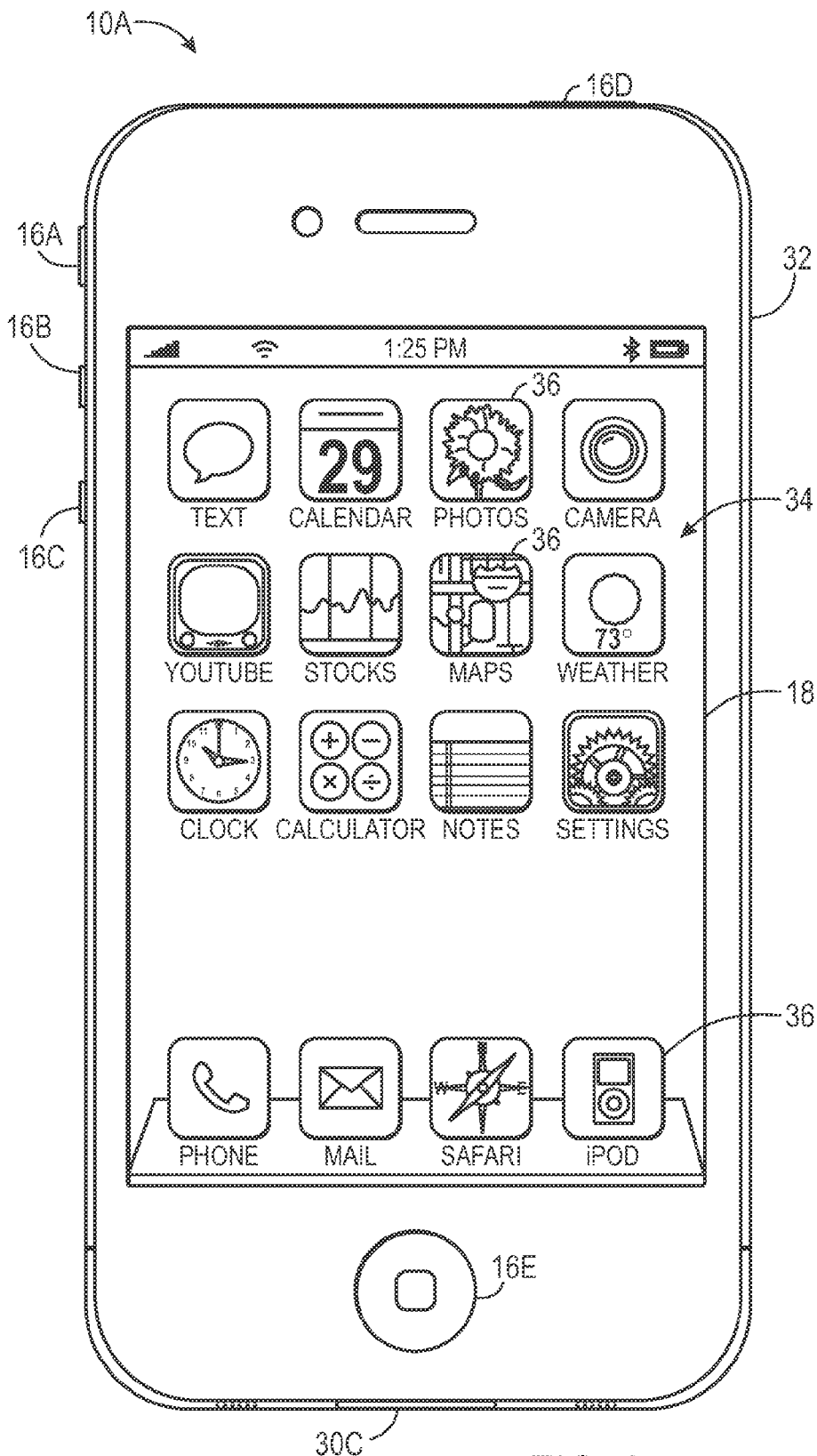
FIG. 2 illustrates a front view of a handheld device, such as an iPhone, representing another embodiment of the electronic device of FIG. 1, in accordance with an embodiment.
Figure 3:
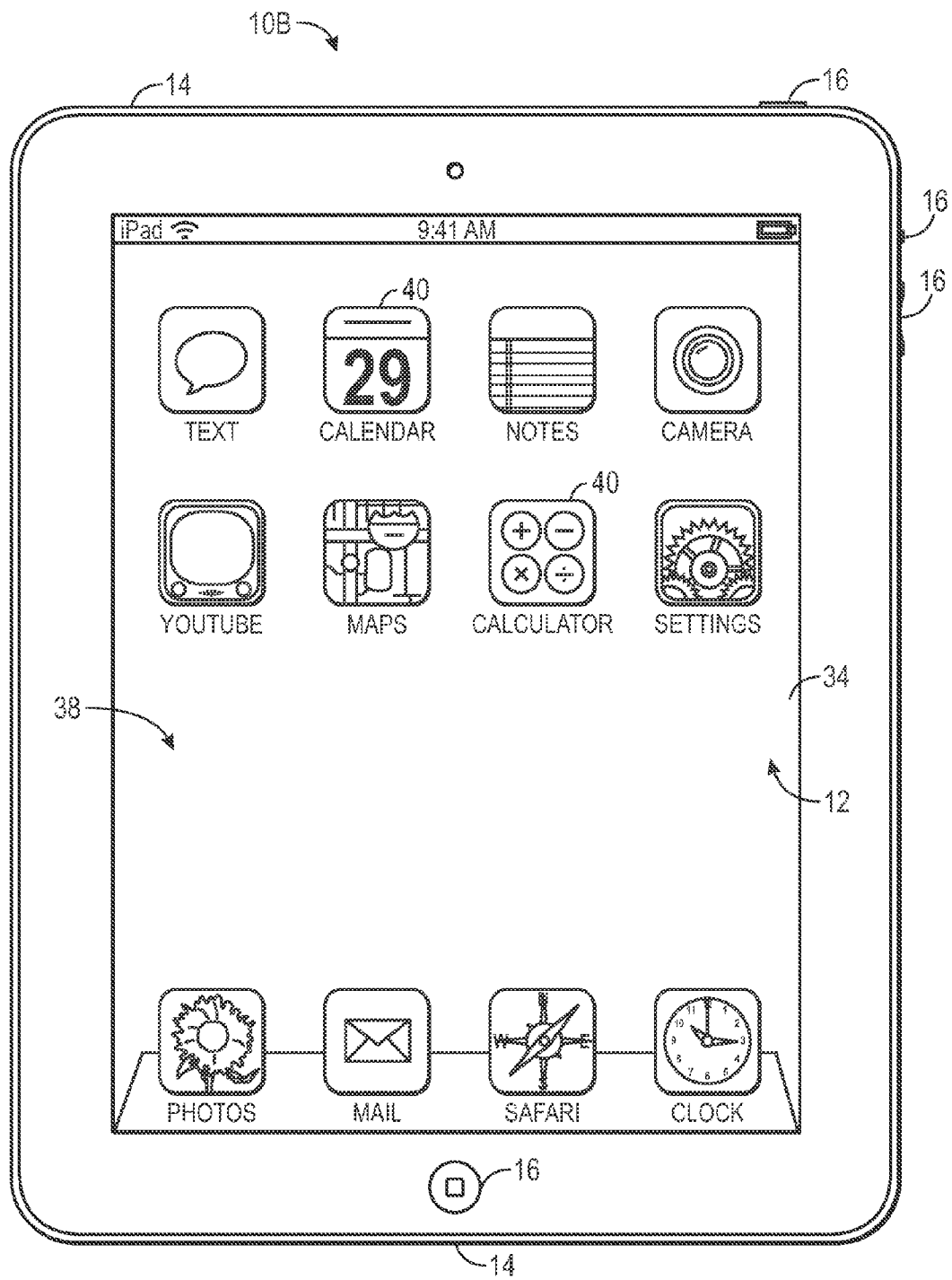
FIG. 3 illustrates a front view of a tablet device, such as an iPad, representing a further embodiment of the electronic device of FIG. 1, in accordance with an embodiment.
Figure 4:
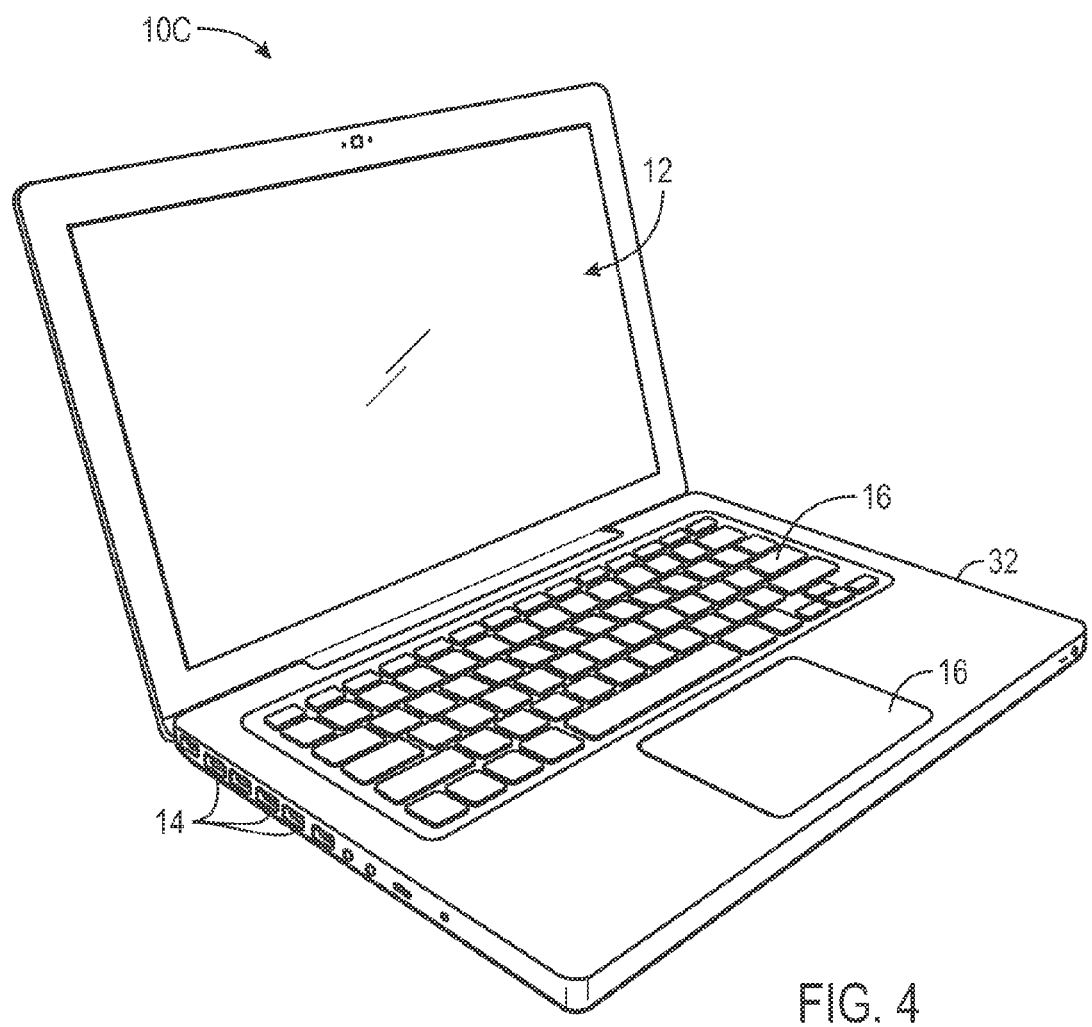
FIG. 4 illustrates a front view of a laptop computer, such as a MacBook, representing an embodiment of the electronic device of FIG. 1, in accordance with an embodiment.

With the foregoing in mind, it is useful to begin with a general description of suitable electronic devices that may employ the various data transferring and synchronizing techniques described below. In particular, FIG. 1 is a block diagram depicting various components that may be present in an electronic device suitable for use with such a display. FIGS. 2, 3, and 4 respectively illustrate perspective and front views of suitable electronic devices, which may be, as illustrated, a notebook computer, a handheld electronic device, or a tablet computing device.

Turning first to FIG. 1, an electronic device 10 according to an embodiment of the present disclosure may include, among other things, a display 12, input/output (I/O) ports 14, input structures 16, one or more processor(s) 18, memory 20, nonvolatile storage 22, an expansion card 24, RF circuitry 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

By way of example, the electronic device 10 may represent a block diagram of the notebook computer depicted in FIG. 2, the handheld device depicted in FIG. 3, the tablet computing device depicted in FIG. 4, or similar devices, such as desktop computers. It should be noted that the processor(s) 18 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 18 and/or other data processing circuitry may be operably coupled with the memory 20 and the nonvolatile storage 22 to execute instructions. Such programs or instructions executed by the processor(s) 18 may be stored in any suitable article of manufacture that includes one or more tangible, computer-readable media at least collectively storing the instructions or routines, such as the memory 20 and the nonvolatile storage 22. The memory 20 and the nonvolatile storage 22 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 18.

The display 12 may be a touch-screen liquid crystal display (LCD), for example, which may enable users to interact with a user interface of the electronic device 10. In some embodiments, the electronic display 12 may be a MultiTouch™ display that can detect multiple touches at once.

The input structures 16 of the electronic device 10 may enable a user to interact with the electronic device 10 (e.g., pressing a button to increase or decrease a volume level). The I/O ports 14 may enable electronic device 10 to interface with various other electronic devices, as may the expansion card 24 and/or the RF circuitry 26. The expansion card 24 and/or the RF circuitry 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 36 to protect interior components from physical damage and to shield them from electromagnetic interference. The enclosure 36 may surround the display 12, which may display indicator icons 38. The indicator icons 38 may indicate, among other things, a cellular signal strength, Bluetooth connection, and/or battery life. The I/O ports 14 may open through the enclosure 36 and may include, for example, a proprietary I/O port from Apple Inc. to connect to external devices.

User input structures 16, in combination with the display 12, may allow a user to control the handheld device 10A. For example, the input structures 16 may activate or deactivate the handheld device 10A, navigate a user interface to a home screen, navigate a user interface to a user-configurable application screen, activate a voice-recognition feature of the handheld device 10A, provide volume control, and toggle between vibrate and ring modes. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a housing 32, a display 12, I/O ports 14, and input structures 16. In one embodiment, the input structures 16 (such as a keyboard and/or touchpad) may be used to interact with the computer 10C, such as to start, control, or operate a GUI or applications running on computer 10C. For example, a keyboard and/or touchpad may allow a user to navigate a user interface or application interface displayed on the display 12.

Figure 5:
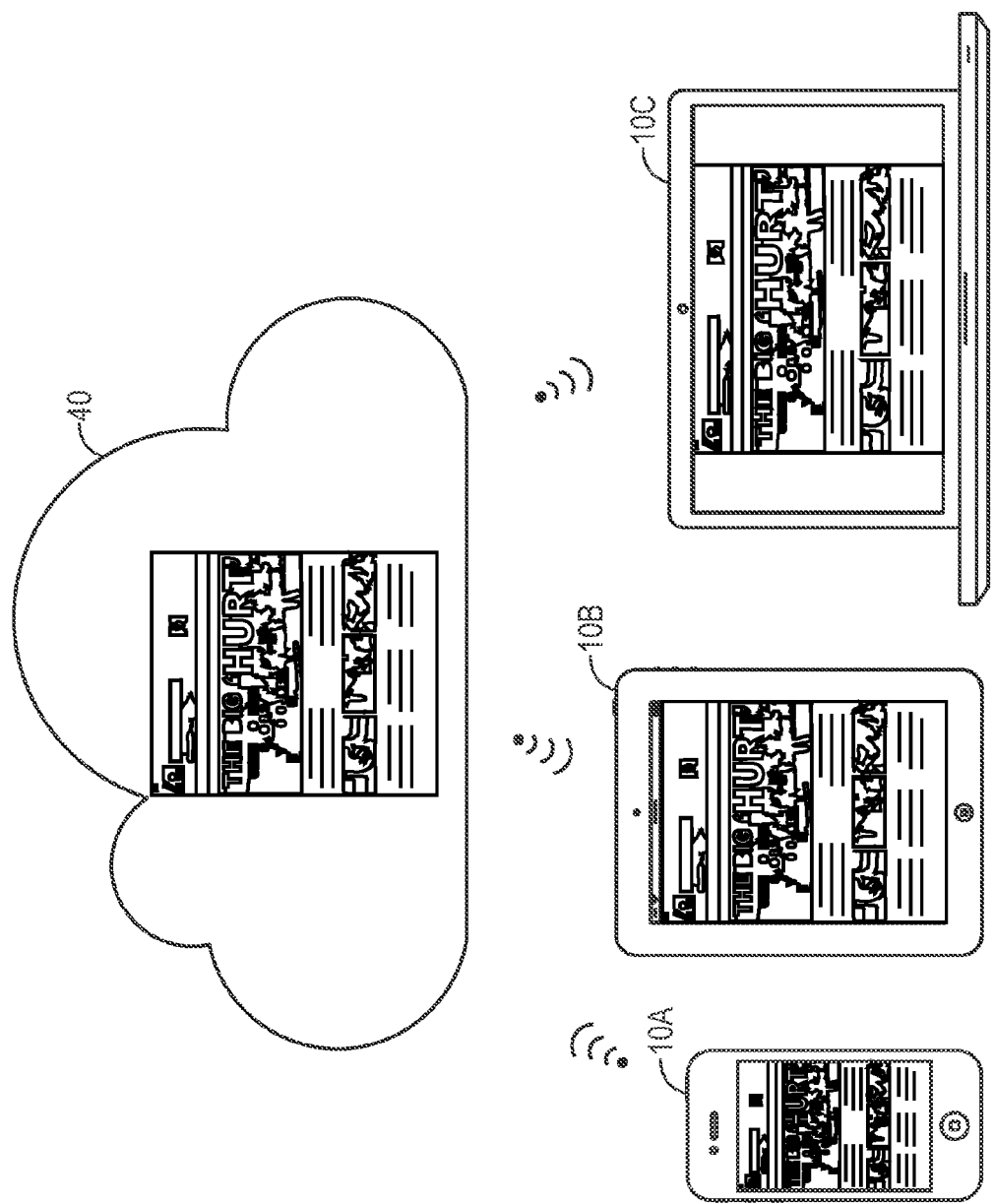
FIG. 5 illustrates a schematic view of multiple electronic devices linked together via a cloud computing service, in accordance with an embodiment.
Figure 6:
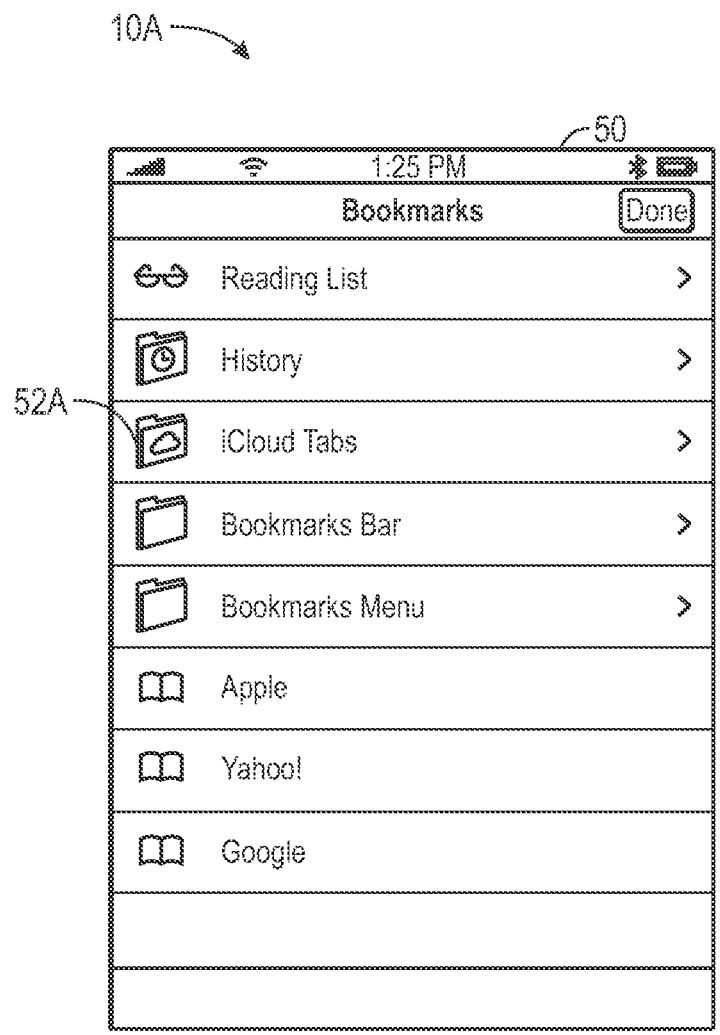
FIG. 6 illustrates an example of a bookmarks screen that provides access to a cloud tabs screen for the hand-held devices illustrated in FIG. 3.
Figure 7C:
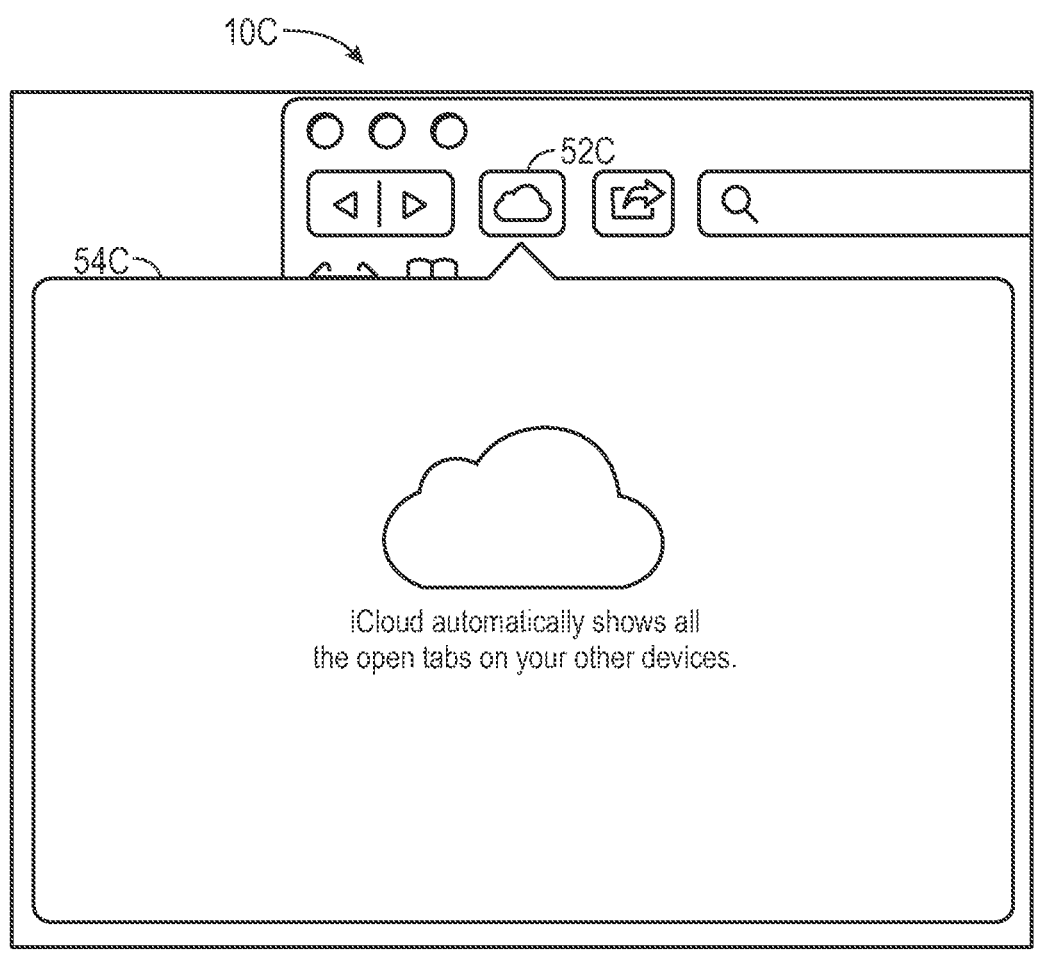

Various types of electronic devices 10, such as the handheld device 10A, the tablet device 10B, and the laptop computer 10C, may be linked together by a cloud computing service 40, as illustrated in FIG. 5. The cloud computing service 40 may be any suitable cloud computing service, such as those offered by Apple, Amazon, Microsoft, Google, and DropBox. However, for the purposes of the remaining examples discussed herein, the handheld device 10A, the tablet device 10B, the laptop computer 10C, and the cloud computing service 40, will be presumed to be an iPhone®, an iPad®, a MacBook Pro®, and iCloud®, respectively, which are available from Apple Inc. Although the synchronization and data transfer techniques will be discussed in the context of these Apple devices and services, it should be readily understood by those of ordinary skill in the art that similar synchronization and data transfer techniques may be employed using other devices and cloud computing services.

To link the devices 10A, 10B, and 10C together, the devices are typically registered under the same account for the cloud computing service 40. To begin this process, the handheld device 10A, for example, may be configured to display a screen 50 that includes an item 52 for selecting information relating to the cloud computing service 40. In this example, since the handheld device 10A is an iPhone® and since the cloud computing service is iCloud®, the item 52 is entitled "iCloud Tabs." Prior to the devices 10A, 10B, and 10C being registered or logged onto a common account of the cloud computing service 40, the selection of a respective item 52A, 52B, or 52C for accessing information relating to the cloud computing service 40 may cause an initial screen or tab 54A, 54B, or 54C to be displayed on the respective device 10A, 10B, and 10C. In this example, the initial screen or tab 54A, 54B, and 54C displays a symbol of a cloud along with the statement "iCloud® automatically shows all the open tabs on your other devices" to explain what function the item 52A, 52B, and 52C is will perform once the devices are logged onto the user's iCloud® account.

Once a user has registered the devices 10A, 10B, and 10C with the user's iCloud® account, data may be transferred and synchronized between the devices 10A, 10B, and 10C. Although various specific types of data transfer and synchronization will be described below with respect to the various examples described with respect to the remaining figures, the data transfer and synchronization using iCloud® as the cloud computing service 40 may generally be accomplished using iCloud® document storage and/or iCloud® key value storage, as is understood by those of ordinary skill in the art. Furthermore, data synchronization may take place as described in U.S. patent application Ser. No. 13/349,519, filed on Jan. 12, 2012, and entitled "Data Synchronization," which is hereby incorporated by reference in its entirety for all purposes.

As discussed above, a person may use several different types of electronic devices 10 during the course of a given day to "stay connected" depending largely upon where the person is and what the person is doing. In other words, if a person is at home or at the office, they may likely employ a less mobile electronic device, such as a desktop computer or laptop computer 10C, whereas if a person is lounging in their backyard or waiting at a gate in an airport, they may utilize a more portable device such as the tablet device 10B. Similarly, if someone is sitting in a meeting or running errands, they may likely choose to stay connected using a more mobile device, such as the handheld device 10A. Since users of any of these devices 10A, 10B, and 10C often stay connected by doing various types of web browsing, it would be useful and convenient if information relating to the web browsing performed on one device would be available on the user's other devices should the user switch between devices during the course of their various activities.

Figure 8B:
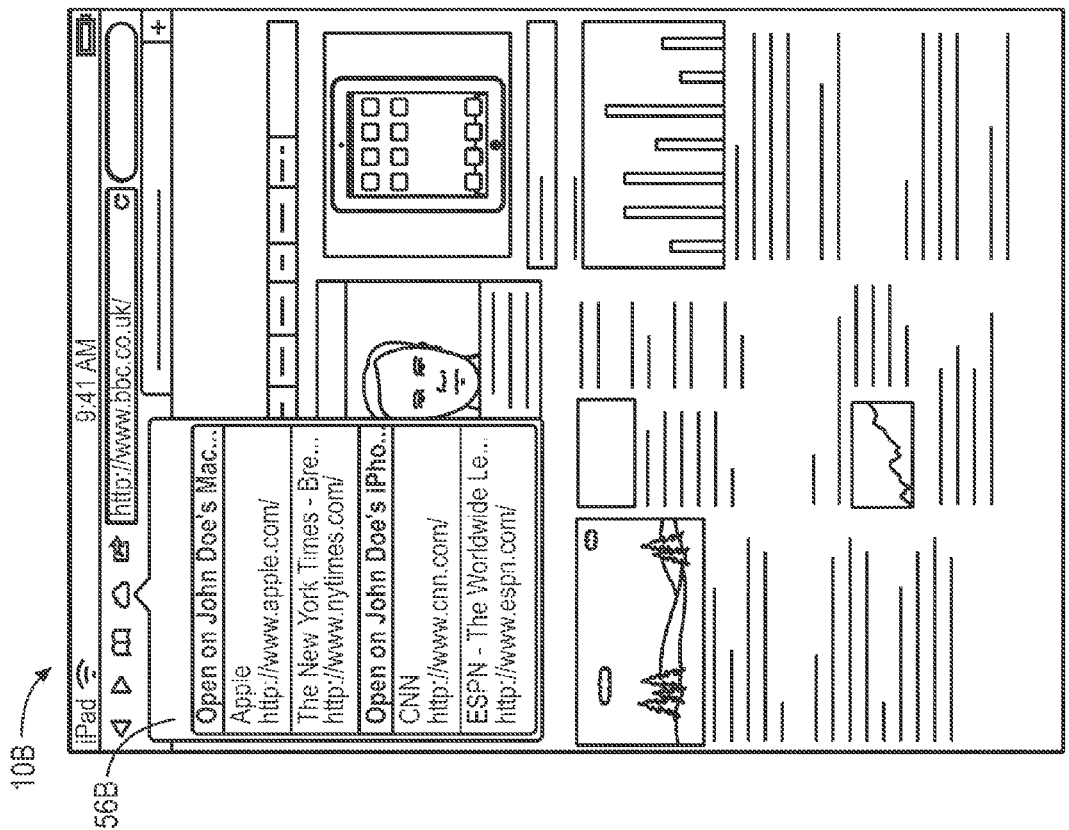
FIGS. 8A, 8B, and 8C illustrate examples of screens or drop-down tabs for the handheld device, the tablet device, and laptop computer, respectively, that show the websites that have been accessed or opened on the other devices, in accordance with an embodiment.
Figure 8A:
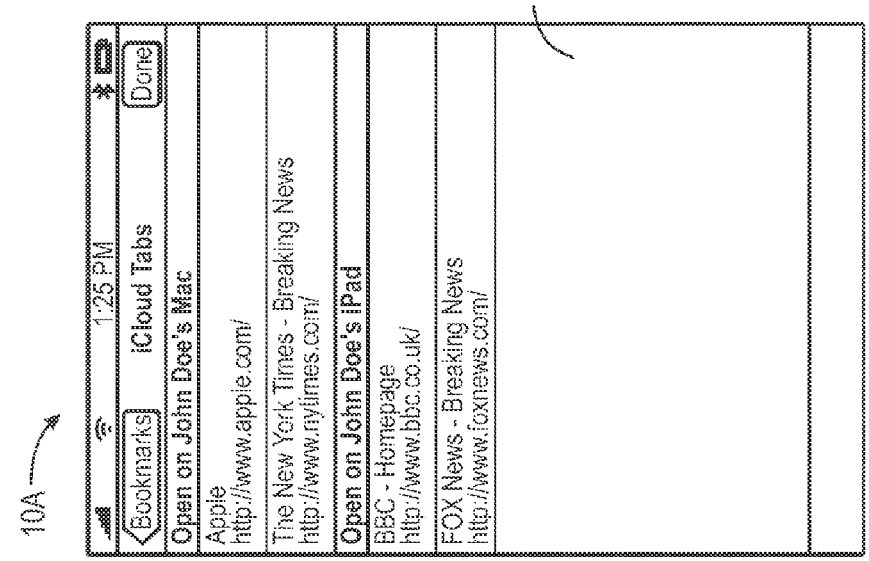
Figure 8C:
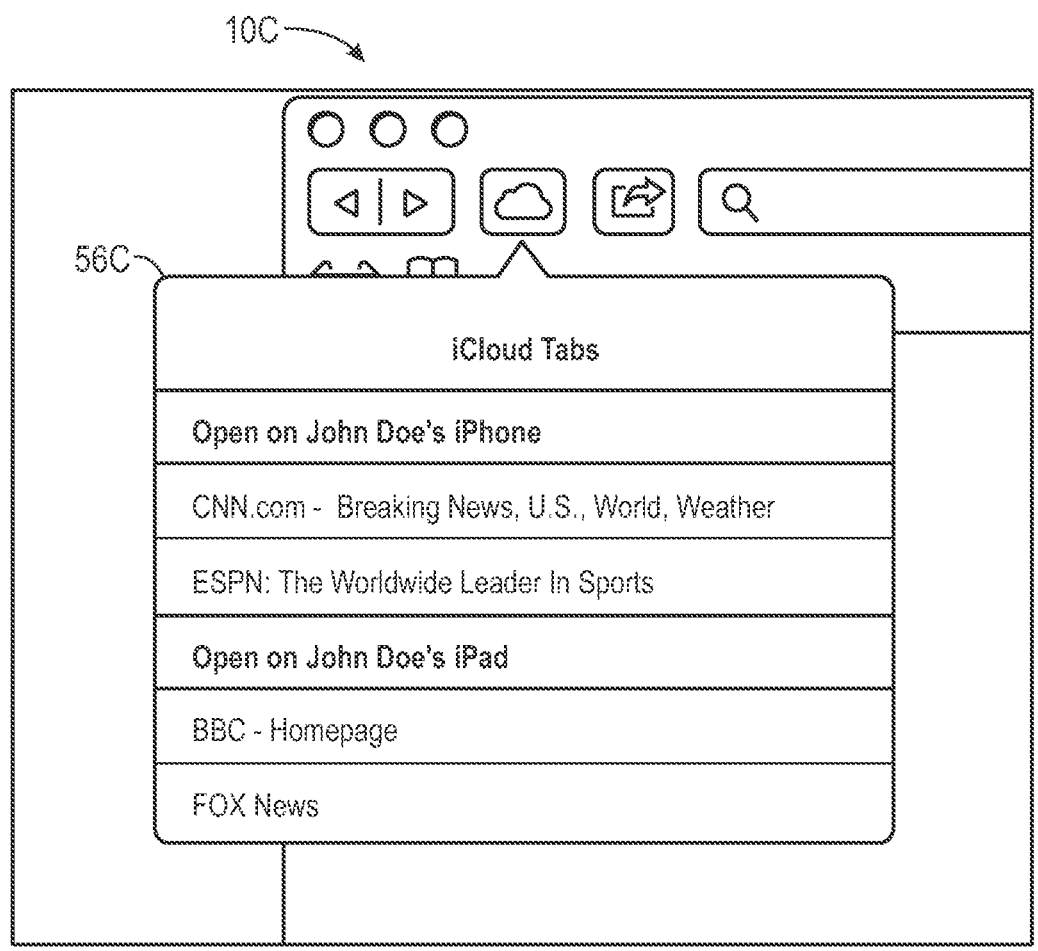

One technique for providing a user with website information accessed on the various devices 10A, 10B, and 10C is illustrated in FIGS. 8A, 8B, and 8C. In these examples, FIG. 8A illustrates a tab screen 56A on the handheld device 10A, FIG. 8B illustrates a drop-down tab screen 56B on the tablet device 10B, and FIG. 8C illustrates a drop-down tab screen 56C on the laptop computer 10C. It should be noted that each of the tab screens 56A, 56B, and 56C include an indication of what websites have been accessed or opened on the user's (e.g., "John Doe's") other devices 10A, 10B, and 10C, that are linked together via the cloud computing service 40. For example, the tab screen 56A indicates that the user's laptop computer 10C (e.g., John Doe's Mac®) has accessed the Apple website and the New York Times website, and further provides an indication that the user's tablet device 10B (e.g., John Doe's iPad®) has accessed the BBC website and the Fox News website. Similarly, FIG. 8B illustrates that the tab screen 56B of the tablet device 10B provides an indication that the user's laptop computer 10C (e.g., John Doe's Mac®) has accessed the Apple website and the New York Times website, and provides a further indication that the user's handheld device 10A (e.g., John Doe's iPhone®) has accessed the CNN website and the ESPN website. Finally, FIG. 8C illustrates that the tab screen 56C of the laptop computer 10C provides an indication that the user's handheld device (e.g., John Doe's iPhone®) has accessed the CNN website and the ESPN website, and provides a further indication that the user's tablet device 10B (e.g., John Doe's iPad®) has accessed the BBC website and the Fox News website. Also, it should be appreciated that the user may have accessed the mobile version of the CNN website (http://m.cnn.com) on the handheld device 10A, but the tab screen 56C of the laptop computer 10C may instead provide the full version of the CNN website (http://cnn.com), and vice versa, or both versions may be provided as an option for the user. This type of data synchronization allows the user to select any of the illustrated websites that are provided under the tab screens 56A, 56B, and 56C so that the user can easily access any of the websites the user has recently visited on any of the various devices 10A, 10B, and 10C in a user-friendly and convenient manner.

For the websites accessed on the laptop computer 10C, the data stored on the server might take the following form:

```
{
  "24B19C75-EE8A-4EC9-B523-506BFE8303F4"=    {
    DeviceName="John Doe's Mac";
    LastModified ="2012-05-30 17:00:35+0000";
    Tabs=      (
      {
      Title="Apple";
      URL=http://www.apple.com/;
    }
      {
      Title="The New York Times-Breaking News, World News & Multimedia";
      URL=http://www.nytimes.com/;
    }
    );
  };
}
```

The first entry (the long string of digits, characters, and dashes) is an identifier that uniquely identifies the device. The data also includes the URLs of the accessed websites. In other words, when the data relating to the websites accessed on the laptop computer 10C is uploaded to the cloud computing service 40, the data may take the above form. Similar data may be uploaded to reflect the websites accessed on the handheld device 10A and the tablet device 10B. Once the website data from the various devices 10A, 10B, and 10C has been uploaded to the cloud computing service 40, the data may be downloaded to the other devices so that all the devices 10A, 10B, and 10C are synchronized.

Of course, there may be circumstances where a user may desire not to upload certain data to the cloud computing service 40 and/or not to share or synchronize such data amongst the various data devices 10A, 10B, and 10C. One example of such s circumstance is illustrated in FIGS. 9A and 9B, where a user is engaging in a private browsing session using the tablet device 10B. During a private browsing session, a user may not want other users of their device or of their linked devices to be able to access information or websites that they have accessed during the private browsing session. Hence, a private browsing session typically allows a user to browse websites without saving any information about which sites or pages have been visited. In accordance with the present techniques, when a user of the tablet 10B is engaged in a private browsing session, other devices that are linked to the tablet computer 10B via the cloud computing service 40, such as the handheld device 10A, will not be provided with information relating to websites that the user has accessed using the tablet device 10B. For example, the tab screen 60A of the linked handheld device 10A may continue to show the websites accessed on the user's laptop device 10C (e.g., John Doe's Mac®), but the tab screen 60A does not provide any indication of which websites may have been accessed during the private browsing session on the tablet device 10B. In this example, the tab screen 60A does not list any indication of the tablet device 10B nor the websites that have been visited during the private browsing session. However, the tab screen 60A could continue to provide an indication that the handheld device 10A is linked to the tablet device 10B, but simply not provide any indication of which websites have been visited using the tablet device 10B. It should also be noted that since the other linked devices 10A and 10C, (e.g., John Doe's iPhone® and Mac®) are not in private browsing mode, the tab screen 60B on the tablet device 10B continues to provide an indication of these devices along with the websites that have been accessed using these devices.

Figure 10A:
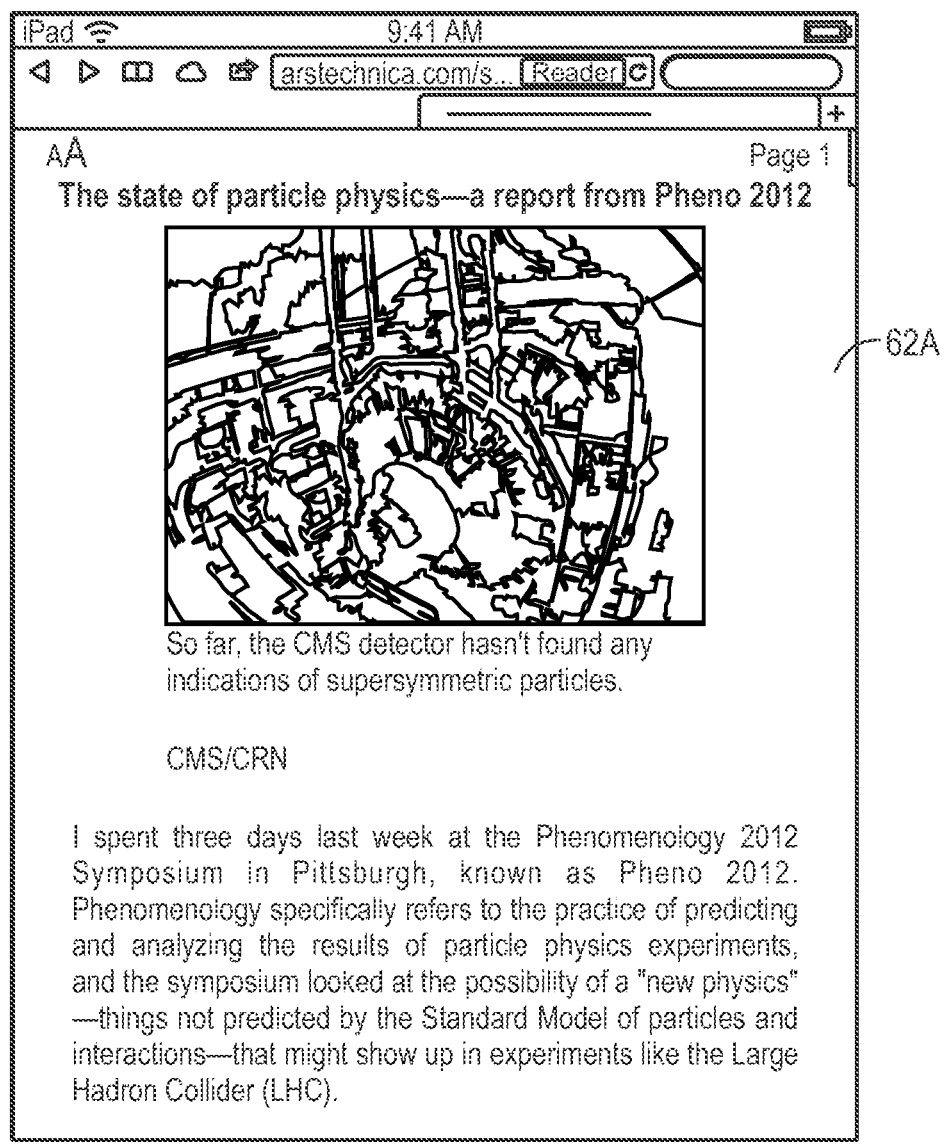
FIGS. 10A and 10B illustrate two pages of a document that has been opened on the tablet device when the tablet device is in reader mode.
Figure 10B:
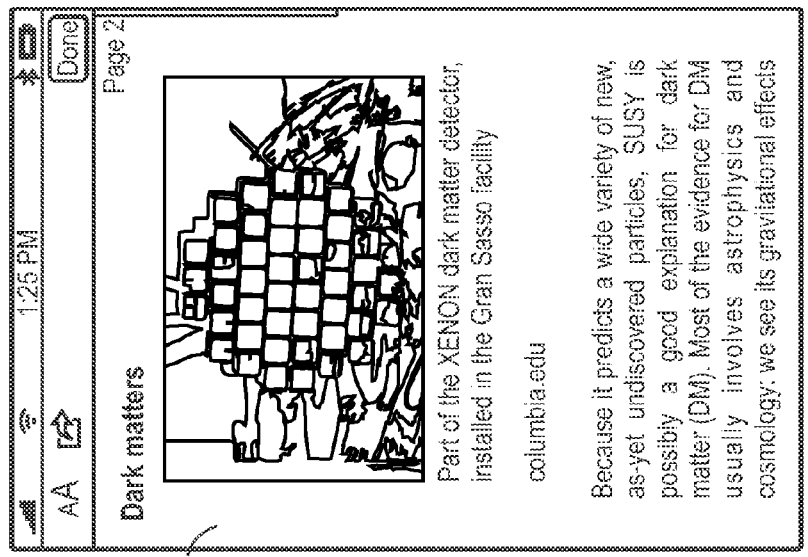
Figure 10C:
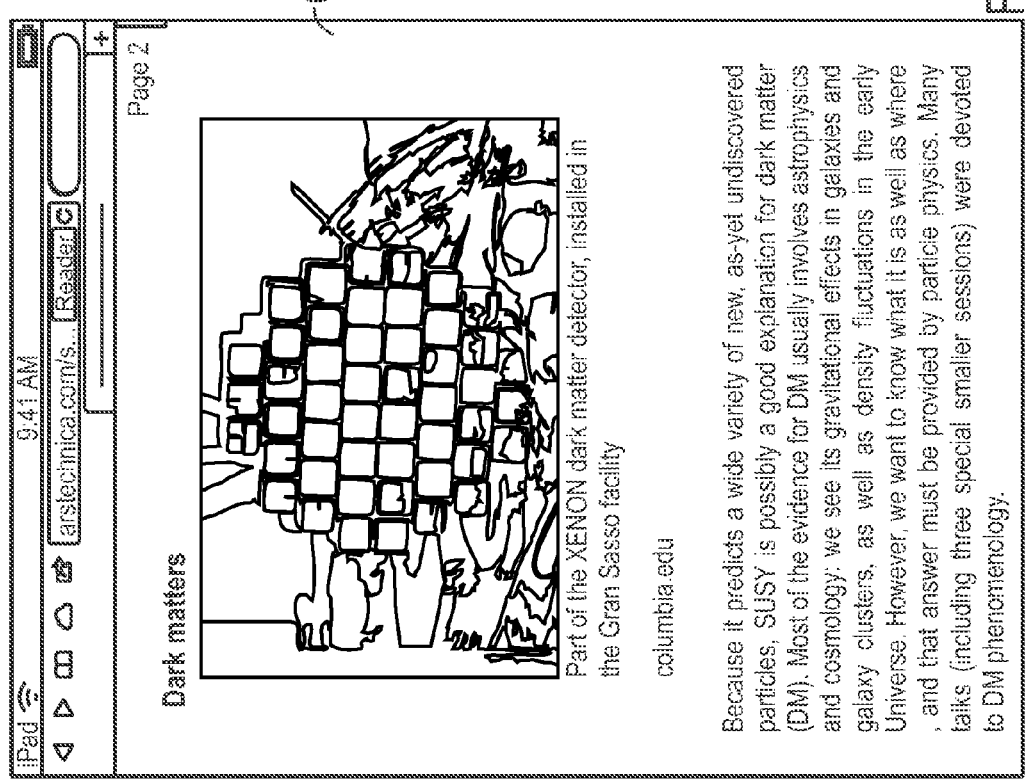
FIG. 10C illustrates the second page of the document that has been opened on the handheld device, in accordance with an embodiment.

During a website browsing session, a user may prefer to view information on the website in a "reader" mode. In the reader mode, the web browser typically strips a webpage down to a newspaper-style text on a blank white page and retains only simple text formatting and inline images. In the reader mode, the web browser may also automatically append pages together so that a user may read the whole article without making any navigational inputs. In the example illustrated in FIGS. 10A, 10B, and 10C, the user of the tablet device 10B has selected the reader mode and is viewing an article. The first page of the article is shown in the screen 62A and the second page of the article is shown in screen 62B. Hence, if the user is viewing the second page of the article when the user decides to switch from the tablet device 10B to the handheld device 10A, when the user accesses the website that the user had previously been viewing using the tablet device 10B, not only does the selected website appear on the handheld device, but it appears in the same mode (e.g., form and/or location) as the user had left it on the tablet device 10B. The information on the handheld device 10A appears in reader mode and the second page of the article is displayed. To accomplish this, the tablet device 10B may upload data to the cloud computing service 40, where the data may take the following form:

```
{
   "24B19C75-EE8A-4EC9-B523-506BFE8303F4"=   {
      Device Name="John Doe's iPad";
      LastModified="2012-05-30 17:00:35 +0000";
      Tabs=    (
         {
         IsShowingReader = 1;
         ReaderScrollPosition =  {
            pageIndex = 2;
            version = 1;
         };
         Title = "Mac OS X 10.7 Lion: the Ars Technica review | Ars Technica";
         URL = "http:/arstechnica.com/apple/2011/07/mac-os-x-10-7/";
         }
      );
   };
}
```

As can be appreciated, this data identifies the device 10B (e.g., John Doe's iPad®), along with the URL website being visited, as well as an indication that the tablet 10B is in reader mode and located at page indicator 2. It should also be appreciated that the data may include current scroll position, magnification, form field contents, current video or audio playback position, as well as forward and/or backward history.

The data that is transferred to the cloud computing service 40 that may be used to synchronize the devices 10A, 10B, and 10C may also include information relating to the autocompletion of information that is entered into the address field of a web browser on the devices 10A, 10B, or 10C. As discussed with regard to the previous devices, the handheld 10A had accessed the CNN website. Hence, as illustrated in FIG. 11A, if a user starts to input the address to the CNN website in the address field 64A, an autocompletion screen 66A appears with the full website address that may be selected by the user. Since the data relating to the websites accessed by the handheld device 10A has been uploaded to the cloud computing service so that it may be shared with the other linked devices, such as the tablet device 10B and the laptop computer 10C, an autocompletion routine running on the devices 10B and 10C may use this shared data as well as their individual data when providing autocompletion suggestions. Accordingly, in the example illustrated in FIG. 11B, when the user of the tablet device 10B begins to input the address of the CNN website in the address field 64B, the autocompletion screen 66B provides the complete address of the CNN website which may be selected by the user.

In a typical cloud computing system, the cloud computing system "pushes" data to the various devices with which it is linked. However, depending upon the frequency of this type of data transmission, the amount of power consumption may become problematic, especially for battery powered devices. Hence, in the embodiments discussed herein, if the electronic device 10 is strictly an AC powered device, such as a desktop computer, it may operate in a manner in which is receives data periodically transmitted from the cloud computing service 40 and in which is periodically transmits data to the cloud computing service 40. Furthermore, data may be transmitted to and/or from the cloud computing service 40 when a new tab screen is opened, when an existing tab screen is closed, when a window containing multiple tab screens is closed, or when the user: navigates to a new website in an existing tab screen, selects a different tab screen in a window, enters or exits reader mode, scrolls through a webpage or pages through an article, makes an existing window active that was behind another window, reorders a tab within a window, enters information into a form field, and/or pauses playback of a video or audio track. Indeed, even battery-powered electronic devices 10 may operate in this manner during periods in which they are AC-powered.

However, when battery-powered electronic devices 10, such as the handheld device 10A, the tablet device 10B, and the laptop computer 10C, are operating in a battery-powered mode, they may selectively "pull" data from the cloud computing service 40 in order to save power. For example, such devices may pull data from the cloud computing service 40 in response to a web browser on the device being opened and/or in response to the user opening a tab screen. Depending upon the power saving requirements of the battery-powered electronic device, they may not pull any further data from the cloud computing service 40 until another web browsing session has begun or until another tab screen is opened. Alternatively, once the initial data pull has occurred, the device may periodically pull data from the cloud computing service 40 thereafter until the web browser is closed and/or until the tab screen is closed. Similarly, a battery-powered electronic device 10 may only push its data to the cloud computing service 40 upon the selection of a new website or when its web browser is closed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   a display; and
   at least one processor configured to:
      while the electronic device is logged into a user's account associated with a cloud computing service:
      receive data relating to:
         a first set of websites open on a first other electronic device that is logged into the user's account and is associated with the cloud computing service; and
         a second set of websites open on a second other electronic device that is logged into the user's account and is associated with the cloud computing service; and
      cause the display to provide an indication of the first set of websites open on the first other electronic device and the second set of websites open on the second other electronic device, wherein the indication comprises:
         a single first identifier for the first other electronic device that is visually associated with a first region comprising a plurality of identifiers for websites in the first set of websites that are open on the first other electronic device, wherein the first identifier for the first other electronic device is displayed concurrently with the plurality of identifiers for websites in the first set of websites that are open on the first other electronic device; and a single second identifier for the second other electronic device that is visually associated with a second region comprising a plurality of identifiers for websites in the second set of websites that are open on the second other electronic device, wherein the second identifier for the second other electronic device is displayed concurrently with the plurality of identifiers for websites in the second set of websites that are open on the second other electronic device, wherein the first region and the second region are non-overlapping.

2. The electronic device, as set forth in claim 1, wherein the data relating to the first set and the second set of open websites comprise at least one of: the URL of each open website, information regarding whether a website currently open is in a reader mode, information relating to magnification of a website currently open, history information relating to the first set and the second set of open websites, form field contents, audio or video playback position, and scroll or page position of a website currently open.

3. The electronic device, as set forth in claim 1, wherein the indication of the first set of websites open on the first other electronic device and the second set of websites open on the second other electronic device comprises:

the plurality of identifiers for websites in the first set of websites that are open on the first other electronic device when the first other electronic device is logged into the user's account and not operating in a private browsing mode;

the plurality of identifiers for websites in the second set of websites that are open on the second other electronic device when the second other electronic device is logged into the user's account and not operating in a private browsing mode.

4. The electronic device, as set forth in claim 1, wherein the at least one processor is configured to allow the user to select a website to access from the indication of the first set of websites and the second set of websites.

5. The electronic device, as set forth in claim 4, wherein the at least one processor is configured to cause the display to display the selected website in the same mode as the website was when open on the first other electronic device or the second other electronic device.

6. The electronic device, as set forth in claim 5, wherein the mode comprises a reader mode.

7. The electronic device, as set forth in claim 1, wherein the at least one processor is configured to cause the display to autocomplete an address of a website being entered by a user using the data relating to the first set and the second set of websites open on the first other electronic device and the second other electronic device.

8. The electronic device, as set forth in claim 1, wherein the at least one processor is configured to cause data relating to websites open on the electronic device to be transmitted to the cloud computing service when a web browser on the electronic device is closed.

9. The electronic device, as set forth in claim 1, wherein the at least one processor is configured to receive data relating to the first set and the second set of websites open on the first other electronic device and the second other electronic device when a web browser on the electronic device is opened.

10. The electronic device, as set forth in claim 1, wherein the at least one processor is configured to receive data relating to the first set and the second set of websites open on the first other electronic device and the second other electronic device when a web browser on the electronic device is opened and periodically thereafter until the web browser is closed.

11. The electronic device, as set forth in claim 1, wherein the at least one processor is configured to receive data relating to the first set and the second set of websites open on the first other electronic device and the second other electronic device when a cloud tab screen on the electronic device is opened.

12. A method of operating an electronic device, comprising:

logging the electronic device into a user's account associated with a cloud computing service; and receiving data relating to:

a first set of websites open on a first other electronic device that is logged into the user's account and is associated with the cloud computing service; and a second set of websites open on a second other electronic device that is logged into the user's account and is associated with the cloud computing service; and displaying an indication of the first set of websites open on the first other electronic device and the second set of websites open on the second other electronic device, wherein the indication comprises:

a single first identifier for the first other electronic device that is visually associated with a first region comprising a plurality of identifiers for websites in the first set of websites that are open on the first other electronic device, wherein the first identifier for the first other electronic device is displayed concurrently with the plurality of identifiers for websites in the first set of websites that are open on the first other electronic device; and a single second identifier for the second other electronic device that is visually associated with a second region comprising a plurality of identifiers for websites in the second set of websites that are open on the second other electronic device, wherein the second identifier for the second other electronic device is displayed concurrently with the plurality of identifiers for websites in the second set of websites that are open on the second other electronic device, wherein the first region and the second region are non-overlapping.

13. The method, as set forth in claim 12, wherein the data relating to the first set and the second set of open websites comprise at least one of: the URL of each open website, information regarding whether a website currently open is in a reader mode, information relating to magnification of a website currently open, history information relating to the first set and the second set of open websites, form field contents, audio or video playback position, and scroll or page position of a website currently open.

14. The method, as set forth in claim 12, comprising allowing the user to select a website to access from the indication of the first set of websites and the second set of websites.

15. The method, as set forth in claim 14, comprising displaying the selected website in the same mode as the website was when open on the first other electronic device or the second other electronic device.

16. The method, as set forth in claim 15, wherein the mode comprises a reader mode.

17. The method, as set forth in claim 12, comprising autocompleting an address of a website being entered by a user using the data relating to the first set and the second set of websites open on the first other electronic device and the second other electronic device.

18. The method, as set forth in claim 12, comprising transmitting data relating to websites open on the electronic device to the cloud computing service when a web browser on the electronic device is closed.

19. The method, as set forth in claim 12, wherein receiving data relating to the first set and the second set of websites open on the first other electronic device and the second other electronic device occurs when a web browser on the electronic device is opened.

20. The method, as set forth in claim 12, wherein receiving data relating to the first set and the second set of websites open on the first other electronic device and the second other electronic device occurs when a web browser on the electronic device is opened and periodically thereafter until the web browser is closed.

21. The method, as set forth in claim 12, wherein receiving data relating to the first set and the second set of websites open on the first other electronic device and the second other electronic device occurs when a cloud tab screen on the electronic device is opened.

22. A non-transitory computer-readable medium having computer executable code stored thereon, the code comprising instructions to:
cause a processor of an electronic device to log the electronic device into a user's account associated with a cloud computing service;
cause the processor to receive data relating to:
a first set of websites open on a first other electronic device that is logged into the user's account and is associated with the cloud computing service; and
a second set of websites open on a second other electronic device that is logged into the user's account and is associated with the cloud computing service; and
cause the processor to cause a display of the electronic device to display an indication of the first set of websites open on the first other electronic device and the second set of websites open on the second other electronic device, wherein the indication comprises:
a single first identifier for the first other electronic device that is visually associated with a first region comprising a plurality of identifiers for websites in the first set of websites that are open on the first other electronic device, wherein the first identifier for the first other electronic device is displayed concurrently with the plurality of identifiers for websites in the first set of websites that are open on the first other electronic device; and
a single second identifier for the second other electronic device that is visually associated with a second region comprising a plurality of identifiers for websites in the second set of websites that are open on the second other electronic device, wherein the second identifier for the second other electronic device is displayed concurrently with the plurality of identifiers for websites in the second set of websites that are open on the second other electronic device,
wherein the first region and the second region are non-overlapping.

23. The non-transitory computer-readable medium of claim 22, wherein the code comprises instructions to cause the processor to cause the display to display the indication of the websites open on the first other electronic device and the second other electronic device when the first set of websites are currently open in a web browser of the first other electronic device and the second set of websites are currently open in a web browser of the second other electronic device.

24. The electronic device, as set forth in claim 1, wherein the at least one processor is configured to cause the display to provide the indication of websites open on the first other electronic device and the second other electronic device while the electronic device is logged into the user's account.

25. The electronic device, as set forth in claim 1, wherein to cause the display to provide an indication of the first set of websites open on the first other electronic device and the second set of websites open on the second other electronic device comprises:
cause the display to provide a menu comprising the indication of the first set of websites open on the first other electronic device and the second set of websites open on the second other electronic device, wherein the menu is displayed concurrently with the display of a website open on the electronic device, and wherein the menu excludes an indicator for the electronic device.

26. The method, as set forth in claim 12, wherein displaying an indication of the first set of websites open on the first other electronic device and the second set of websites open on the second other electronic device comprises:
displaying a menu comprising the indication of the first set of websites open on the first other electronic device and the second set of web sites open on the second other electronic device, wherein the menu is displayed concurrently with the display of a website open on the electronic device, and wherein the menu excludes an indicator for the electronic device.

27. The non-transitory computer-readable medium of claim 22, wherein to cause the processor to cause a display of the electronic device to display an indication of the first set of websites open on the first other electronic device and the second set of websites open on the second other electronic device comprises:
cause the processor to cause a display of the electronic device to display a menu comprising the indication of the first set of websites open on the first other electronic device and the second set of websites open on the second other electronic device, wherein the menu is displayed concurrently with the display of a website open on the electronic device, and wherein the menu excludes an indicator for the electronic device.

28. The method, as set forth in claim 12, wherein the indication of the first set of websites open on the first other electronic device and the second set of websites open on the second other electronic device comprises:
the plurality of identifiers for websites in the first set of websites that are open on the first other electronic device when the first other electronic device is logged into the user's account and not operating in a private browsing mode;
the plurality of identifiers for websites in the second set of websites that are open on the second other electronic device when the second other electronic device is logged into the user's account and not operating in a private browsing mode.

29. The method, as set forth in claim 12, further comprising: while logged into the user's account, displaying the indication of websites open on the first other electronic device and the second other electronic device.

30. The non-transitory computer-readable medium of claim 22, wherein the data relating to the first set and the second set of open websites comprise at least one of: the URL of each open website, information regarding whether a website currently open is in a reader mode, information relating to magnification of a website currently open, history information relating to the first set and the second set of open websites, form field contents, audio or video playback position, and scroll or page position of a website currently open.

31. The non-transitory computer-readable medium of claim 22, wherein the indication of the first set of websites open on the first other electronic device and the second set of websites open on the second other electronic device comprises:
the plurality of identifiers for websites in the first set of websites that are open on the first other electronic device when the first other electronic device is logged into the user's account and not operating in a private browsing mode;
the plurality of identifiers for websites in the second set of websites that are open on the second other electronic device when the second other electronic device is logged into the user's account and not operating in a private browsing mode.

32. The non-transitory computer-readable medium of claim 22, wherein the code comprises instructions to cause the processor to allow the user to select a website to access from the indication of the first set of websites and the second set of websites.

33. The non-transitory computer-readable medium of claim 32, wherein the code comprises instructions to cause the processor to cause the display to display the selected website in the same mode as the website was when open on the first other electronic device or the second other electronic device.

34. The non-transitory computer-readable medium of claim 33, wherein the mode comprises a reader mode.

35. The non-transitory computer-readable medium of claim 22, wherein the code comprises instructions to cause the processor to cause the display to autocomplete an address of a website being entered by a user using the data relating to the first set and the second set of websites open on the first other electronic device and the second other electronic device.

36. The non-transitory computer-readable medium of claim 22, wherein the code comprises instructions to cause the processor to cause data relating to websites open on the electronic device to be transmitted to the cloud computing service when a web browser on the electronic device is closed.

37. The non-transitory computer-readable medium of claim 22, wherein the code comprises instructions to cause the processor to receive data relating to the first set and the second set of websites open on the first other electronic device and the second other electronic device when a web browser on the electronic device is opened.

38. The non-transitory computer-readable medium of claim 22, wherein the code comprises instructions to cause the processor to receive data relating to the first set and the second set of websites open on the first other electronic device and the second other electronic device when a web browser on the electronic device is opened and periodically thereafter until the web browser is closed.

39. The non-transitory computer-readable medium of claim 22, wherein the code comprises instructions to cause the processor to receive data relating to the first set and the second set of websites open on the first other electronic device and the second other electronic device when a cloud tab screen on the electronic device is opened.

40. The non-transitory computer-readable medium of claim 22, wherein the code comprises instructions to cause the processor to, while logged into the user's account, display the indication of websites open on the first other electronic device and the second other electronic device.

* * * * *

UNITED STATES PATENT AND TRADEMARK OFFICE
CERTIFICATE OF CORRECTION

PATENT NO. : 9,680,927 B2  
APPLICATION NO. : 13/492057  
DATED : June 13, 2017  
INVENTOR(S) : Paul R. Knight et al.

Page 1 of 1

It is certified that error appears in the above-identified patent and that said Letters Patent is hereby corrected as shown below:

On the Title Page

Column 1, item (60) under "Related U.S. Application Data", Lines 1-2, delete "Provisional application No. 61/595,114, filed on Feb. 5, 2012."

Signed and Sealed this  
Twenty-ninth Day of January, 2019

Andrei Iancu  
*Director of the United States Patent and Trademark Office*